United States Patent [19]

Johnson et al.

[11] 3,859,162

[45] Jan. 7, 1975

[54] PRE-PREG MATERIALS, CHEMICALLY INTEGRAL COMPOSITE FOAM STRUCTURES PREPARED THEREFROM, AND METHODS OF PREPARATION

[75] Inventors: James William Johnson, Marine on St. Croix; John E. Peterson, Lindstrom; Charles Reich, St. Paul, all of Minn.

[73] Assignee: Minnesota Mining & Manufacturing Company, St. Paul, Minn.

[22] Filed: May 11, 1973

[21] Appl. No.: 359,526

[52] U.S. Cl............ 161/160, 117/126 GB, 156/79, 161/161, 161/174, 161/181, 161/190, 260/2.5 BF, 260/37 R, 260/37 M, 260/77.5 R, 260/77.5 AP
[51] Int. Cl............................................. B32g 3/26
[58] Field of Search.... 260/2.5 BF, 79, 37 R, 37 M, 260/77.5 AP, 77.5 R; 161/190, 160, 161, 174, 181; 117/126 GB; 156/79

[56] References Cited
UNITED STATES PATENTS

| | | | |
|---|---|---|---|
| 2,941,966 | 6/1960 | Campbell...................... | 260/2.5 BF |
| 3,657,161 | 4/1972 | Bernard et al. .............. | 260/2.5 AW |
| 3,723,364 | 3/1973 | McLaughlin et al........... | 260/2.5 BF |
| 3,790,509 | 2/1974 | Diehr............................. | 260/2.5 BF |

*Primary Examiner*—Edward G. Whitby
*Attorney, Agent, or Firm*—Alexander, Sell, Steldt and DeLaHunt

[57] ABSTRACT

Pre-preg materials and flexible tapes comprising polycarbodiimide prepolymers and a fiber reinforcing material, and reinforced, chemically integral, composite foam structures prepared from said pre-pregs. The composite structures are prepared by curing said pre-pregs in combination with additional polycarbodiimide-forming, foamable precursors by the application of heat.

17 Claims, No Drawings

PRE-PREG MATERIALS, CHEMICALLY INTEGRAL COMPOSITE FOAM STRUCTURES PREPARED THEREFROM, AND METHODS OF PREPARATION

This invention relates generally to flexible pre-preg materials comprising solid, flowable, isocyanate-containing polycarbodiimide prepolymers and a fibrous reinforcing material, the use of these pre-preg materials to form various crosslinked polycarbodiimide polymer structures and the structures thereby formed.

One aspect of this invention relates to chemically integral reinforced composite foam structures prepared from the pre-pregs of this invention. These structures comprise crosslinked polycarbodiimide polymers and a fibrous reinforcing material and have at least one first portion which is a fiber reinforced portion substantially free of autogenous voids visible to the naked eye, and at least one second portion which is a foamed portion chemically integral with the first portion. In the present invention these portions have dimensions which are selected and controlled as desired and are substantially simultaneously cured to a crosslinked state by the application of heat.

Another aspect of this invention relates to flexible tape constructions prepared from the pre-pregs of this invention which can be applied to various surfaces and cured in place by the application of heat to provide a reinforced, crosslinked polymeric structure.

Polycarbodiimide polymers are known in the prior art. The production of polycarbodiimide polymers is disclosed in U.S. Pat. No. 2,941,966 issued June 21, 1960 to Campbell; U.S. Pat. No. 2,941,983 issued June 21, 1960 to Smeltz; and U.S. Pat. No. 2,853,473 issued Sept. 23, 1958 to Campbell. The preparation of an isocyanate terminated carbodiimide has been disclosed in the *Journal of Organic Chemistry*, Vol. 28 (1963), page 2069, and the preparation of a carbodiimide oligomer which is isocyanate terminated is disclosed in U.S. Pat. No. 3,522,303 issued July 28, 1970 to Ulrich.

Numerous catalysts which may be used in the production of polycarbodiimide polymers are known. U.S. Pat. No. 2,941,966 discloses the use of phosphorus containing compounds which are particularly desirable in the production of polycarbodiimide polymers. U.S. Pat. No. 3,522,303 discloses heterocyclic phosphorus-containing compounds such as 2- substituted 1,3,2-diazo-phospholane-2-oxides which can be used to form low molecular weight polycarbodiimide oligomers.

It is also known to use polycarbodiimide polymers for coating cellulosic materials to improve compressive strength and moisture resistance, as in U.S. Pat. No. 3,450,562, issued June 17, 1969, to Hoeschele.

The prior art disclosures relate to oligomers or polymers having limited usefulness in the production of a foamed reinforced composite structure. These prior art disclosures describe high molecular weight polycarbodiimide polymers which are insoluble and infusible, and once the polycarbodiimide polymer is crosslinked, it is extremely difficult, and frequently impossible, to form the polymer into articles of useful shape and size. Formerly, the production of high molecular weight polycarbodiimides by the ultimate user required the use of toxic liquid components such as tolylene diisocyanate, making the production of polycarbodiimide polymers undesirable and dangerous due to increased hazards to working personnel and the danger of pollution to the surrounding area.

In the copending U.S. Pat. application of Reich Ser. No. 242,838, filed Apr. 10, 1972, now U.S. Pat. No. 3,755,242 a new class of isocyanate-terminated solid, soluble, fusible, storable prepolymers suitable for producing high molecular weight polycarbodiimides is disclosed. Briefly, these prepolymers are solid, soluble, and fusible polycarbodiimides having aromatic radicals bonded to carbodiimide groups. They are isocyanate end-capped and are substantially homogeneously mixed with a catalyst which is capable of promoting further polymerization of the prepolymer. The prepolymer-catalyst mixture is storable at low to moderate temperatures. Upon the application of heat, the reaction of the isocyanate-terminated carbodiimide prepolymer will continue, forming a high molecular weight polycarbodiimide from a one-part prepolymeric source. These prepolymers may be described as isocyanate-terminated solid, soluble, fusible, storable, prepolymers for the production of high molecular weight polycarbodiimides which consist essentially of linear chains having about 5 – 17 repeating units containing carbodiimide linkages formed from a mixture of preselected polycarbodiimide-forming polyisocyanate monomers, with the mixture having an isocyanate functionality of about 2.0 – 2.15, the monomers having a melting point below 200° C., and an isocyanate equivalent weight of about 80–400. These prepolymers are in admixture with catalysts for formation of polycarbodiimide and just sufficient inert, compatible solvent to dissolve the catalysts and contain about 5–25 percent of the isocyanate groups originally present in the monomers.

The preferred prepolymers include compounds of the following structure:

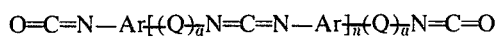

wherein Ar is a divalent arylene radical chosen from the class consisting of:

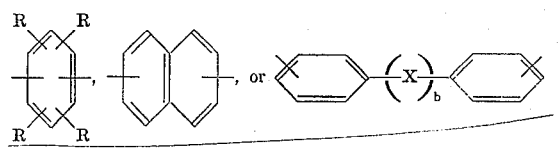

wherein R may be hydrogen, chloro or methyl, $b$ is 0 or 1, and when $b$ is 1, X is $-CH_2-$, $-O-$, $-S-$, or $-SO_2-$; Q is a divalent radical having the formula:

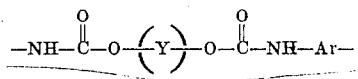

wherein Y is the residue of a glycol devoid of its terminal hydroxyl moieties; $a$ can be 0 or 1; when $a$ is 0, $n$ has a value from about 5 to 17, and when $a$ is 1, $n$ has a value from about 1 to 5. It will be understood that the chain length of the individual polymer chains in any given prepolymer mixture will vary, i.e. shorter and longer chains can be present at the same time.

These prepolymers can be prepared in powder form and on the application of heat can be cured to crosslinked polycarbodiimide polymers. In addition, upon curing these crosslinkable powders generate carbon dioxide which functions as a blowing agent, eliminating the need for the introduction of a separate blowing agent. By proper selection of prepolymer powder, additives, and curing conditions, these powders can be used to produce relatively void free crosslinked polymers, or low density crosslinked foams, as will be more fully described hereinafter.

Reinforced composite foam structures have long been known in the prior art. These have generally been prepared by providing a polymeric shell or form, which is reinforced with fibrous materials, and subsequently filling the shell with a syntactic or blown foam or by adhesively bonding or laminating a foam material to a polymeric substrate. Fabricating these structures presents the difficult problem of providing adequate strength at the foam-shell or foam-substrate interface to prevent delamination or shear failure at the interface.

Chemically integral, foamed thermoset structures are also known and may be prepared by foaming a material or injecting a polymeric foam into a mold having walls maintained at a temperature such that the walls cause collapse of the surface cells to form a solid skin of varying thickness depending on the materials and conditions used. These chemically integral foam structures are inherently free of a foam-skin or foam-substrate interface, and thus are free of the difficulty encountered in fabricating the laminated composites described above, i.e. achieving acceptable strength at the interface.

Chemically integral, foamed structures made of crosslinked polycarbodiimide polymers are known. These foamed structures have been made from precursors such as the liquid monomers of Campbell (U.S. Pat. No. 2,941,966) or the aforementioned prepolymer powders of Reich (U.S. application Ser. No. 242,838) now U.S. patent 3,755,242. Because polycarbodiimide polymers generate a blowing agent, i.e. carbon dioxide, in situ during cure, these foamed structures have not been capable of developing a thick skin substantially free of visible autogenous voids at the surface of a mold as is possible with other foamable polymeric materials. The generation of carbon dioxide throughout the polymer during cure causes foaming throughout the polymeric mass, thus preventing any significant formation of a skin substantially free of visible autogenous voids at the surface of the polymer mass or at the mold walls. The worker has little control over the thickness of the skin or densified portion of the structure, and accordingly the lack of a thick skin substantially free of autogenous voids visible to the naked eye is an inherent limitation in this system and cannot be controlled to any significant extent. For this reason the fabrication of chemically integral reinforced composite foam structures from polycarbodiimide polymers has not been possible. The incorporation of a fibrous reinforcing material of any significant thickness in the skin portion of these structures would not significantly increase structural strength, due to the presence of autogenous voids substantially throughout the structure. In order to perform its reinforcing function, the reinforcing layer should be essentially free of voids throughout the fibrous reinforcing material.

It is an object of the present invention to provide a fiber-reinforced pre-preg structure containing polycarbodiimide prepolymer.

It is a further object of the present invention to provide a chemically integral, reinforced composite foam structure comprising crosslinked polycarbodiimide polymer and having a fiber reinforced portion of controlled thickness, which is essentially free of autogenous voids visible to the naked eye, and a method of making such structures.

It is also an object of the present invention to provide flexible fiber-reinforced tape constructions containing polycarbodiimide prepolymers.

It has now been found that pre-preg materials containing one or more polycarbodiimide prepolymers can be prepared and used to provide unique crosslinked, reinforced, foamed, polycarbodiimide structures of various types. One aspect of this invention relates to the use of these polycarbodiimide pre-preg materials to provide protective insulating and reinforcing tapes which may be conveniently applied to a substrate and subsequently cured in place with or without foaming, as desired. Another aspect of this invention relates to the use of these polycarbodiimide pre-preg materials in combination with additional polycarbodiimide precursors to form fiber reinforced composite foam structures having at least one fiber reinforced first portion or layer which is unfoamed, i.e. essentially free of autogenous voids which are visible to the naked eye, and at least one second foamed portion or layer which is chemically integral with the first portion.

The term "chemically integral" as used herein is intended to describe materials which have a continuous chemical identity and which, even if having areas differing in density, fillers, void structure, etc., are chemically connected by a continuous matrix of organic polymer. Structures in the present invention are chemically integral due to the void free and foamed portions being produced from the same class of polymer and being substantially simultaneously cured so that a chemical bonding occurs across the interface or zone between the void free and foamed portions of the structure.

The term "reinforcing portion" as used herein refers to that portion of the structures of the present invention which is substantially coextensive with the physical extremities of the reinforcing material. In the case of a web, for example, it refers to the outer boundaries of the web as a whole, and not the individual fibers in the web.

The term "voids" or "autogenous voids" as used herein is intended to refer to voids which are internally generated in the polymer such as voids which are formed in a foamed polymer which generates a blowing agent internally.

The prepolymers useful in preparing the pre-preg materials of this invention can be prepared according to the teachings of the Reich U.S. Pat. application Ser. No. 242,838, now U.S. Pat. No. 3,755,242, as discussed herein. These prepolymers are solid, soluble, and fusible polycarbodiimide prepolymers having aromatic radicals bonded to carbodiimide groups, are isocyanate end-capped, and substantially homogeneously mixed with a catalyst which promotes further polymerization of the prepolymer. The prepolymer-catalyst mixture is storable at low to moderate temperatures, and upon the application of heat the polymerization of the isocyanate-terminated carbodiimide prepolymer will continue, forming a high molecular weight infusible crosslinked polycarbodiimide polymer from a one-part prepolymeric source. In addition, carbon dioxide is evolved during polymerization which can cause foaming of the polymer during cure. It has been found that this foaming can be controlled by proper selection of prepolymer, additives, and curing conditions to provide the unique chemically integral, reinforced, composite foam structures of this invention.

In the present invention, these prepolymer powders are deposited onto reinforcing fibers and fused thereon without fully curing the prepolymer, thereby forming a "pre-preg", i.e. a cohesive fiber-prepolymer admixture in which the prepolymer is capable of being further cured to an intermediate or fully cured state upon the controlled application of heat sufficient to maintain the prepolymer at or above its melt temperature, generally in the range of 75° C. to 200° C. The pre-preg material can be formed, applied or wrapped as desired and cured by the application of heat to provide a fiber-reinforced, crosslinked structure, which structure can be foamed or void-free as desired.

The ability to control the degree of foam or void generation during curing of the pre-pregs of the present invention allows the preparation of the unique reinforced crosslinked polycarbodiimide structures of the present invention. A variety of factors affect the degree of foam or void generation on curing the pre-preg materials of this invention. The prepolymer powders useful in this invention will, when cured free of external influences such as application of pressure and/or the presence of fillers, provide a reinforced foamed structure. Additives such as surfactants help to stabilize the foam cells generated and enhance the foaming effect. Foams having a density of 1 or 2 pcf can be obtained. However, it may be desirable to decrease the foaming tendencies of the pre-preg in order to provide enhanced reinforcing properties in the cured structures of this invention. Accordingly, various methods have been developed to decrease or substantially prevent the formation of autogenous voids in the cured pre-preg. This may be accomplished by selecting prepolymer powders having a relatively small number of free isocyanate groups capable of generating carbon dioxide. Fully or partially curing or "advancing" the pre-pregs under the influence of pressure can provide nearly void free, crosslinked structures. The presence of fillers and reinforcing materials in the pre-preg causes the collapse of foam cells contacting these materials and a resultant densification in these areas.

By proper utilization of the ability to control the generation of autogenous voids, crosslinked structures having useful and unique properties can be provided. The pre-pregs of this invention can be prepared and subsequently brought into contact with, as by coating, layering, etc., one or more additional foamable polycarbodiimide forming precursors, i.e. monomers or oligomers (with suitable catalyst) or polycarbodiimide prepolymers as described above. The composite thus formed can be cured under conditions of heat and pressure sufficient to cause foaming of at least a portion of the structure, while the reinforced portion of the structure simultaneously cures without any significant amount of foaming, i.e. essentially free of autogenous voids visible to the naked eye, both portions being made chemically integral by such curing. The ability to control the degree of foam generation in selected portions of a given structure allows the formation of chemically integral, reinforced, composite foam structures. Moreover, the dimensions of these portions can be controlled with the use of the pre-preg materials of the present invention by employing reinforcing fibers such as webs, etc., of varying thickness in the pre-preg sheets, by bonding a plurality of pre-preg sheets together, by bending and forming the pre-preg sheets into various forms, by regulating the ratio of reinforcing material to prepolymer powder in the pre-preg sheets, and by other methods which will occur to one skilled in the art.

The simultaneous cure of the polycarbodiimide prepolymer in the pre-preg and the polycarbodiimide precursors or prepolymer adjacent the pre-preg produces a cure or chemical bonding between these two portions without the need for special adhesives or bonding agents, which makes the final construction chemically integral. This technique makes it possible to produce foamed structures having fiber reinforced portions or layers, which layers are essentially free of autogenous voids, visible to the naked eye, are of regulated thickness, and have outstanding strength.

Alternatively, the pre-pregs of this invention can be prepared in the form of flexible tapes which can be applied to a surface or substrate and cured in place to provide a protective, reinforcing, crosslinked structure. The degree of foaming can be varied to alter the physical properties, e.g. the insulating or strength properties, of the crosslinked structure. The foamed structures prepared in this manner contain autogenous voids visible to the naked eye substantially throughout the structure, including the reinforcing portion.

The pre-pregs of this invention can be used to make many structures which would occur to one skilled in the art. They may be formed into desired shapes prior to curing and may be cured in a "free" or a confined environment. When confined, relatively few voids or foam cells are formed. When cured free of confinement, the pre-pregs may foam out of and through the reinforcing material on one or more surfaces. Still further, in certain composite structures wherein a foamable precursor is enclosed by pre-preg reinforcing walls, the foam generated by the core material during cure in a closed mold results in the build-up of internal pressure against the wall portions, further confining and reducing foam formation in the reinforcing wall portion.

The powdered prepolymers useful in the present invention can be made by dissolving a phosphorus-containing catalyst such as 1-phenyl-3-methyl-2-phospholene-1-oxide in a suitable solvent, using just sufficient solvent to dissolve the catalyst, and adding the dissolved catalyst to the liquid organic polyisocyanate, e.g. tolylene diisocyanate. The addition of the catalyst is approximately about 0.1 to 5 percent by weight of the polyisocyanate with 0.2 to 1 percent by weight of the polyisocyanate being preferred, the catalyst being added to the liquid polyisocyanate. Where solvent is used, no solvent other than that necessary to dissolve the catalyst is employed in the production of this latent one-part prepolymeric source of polycarbodiimide. The use of solvent in excess of that necessary to just dissolve the catalyst will favor the continued formation of carbodiimide and result in an insoluble, infusible polymer rather than a prepolymer which is both soluble and fusible. Mixtures of the different polyisocyanate compounds can be used. Thus, where tolylene diisocyanate is used, the isocyanate may be 100 percent by weight of 2,4-tolylene diisocyanate or a mixture of 80 percent by weight of 2,4-tolylene diisocyanate and 20 percent by weight of 2,6-tolylene diisocyanate.

Useful diisocyanates include those which are liquid at temperatures where the addition of the active catalyst does not cause polymerization to a high molecular weight, insoluble, infusible polymer. The diisocyanates useful in this invention are chosen by their melt temperature. Representative diisocyanates include 2,4-tolylene diisocyanate; 4,4'-methylene (di-p-phenylene) diisocyanate; 4,4'-diphenylene diisocyanate; 2,6-tolylene diisocyanate, m-phenylene diisocyanate; 1,5-naphthylene diisocyanate, durene diisocyanate, xylene diisocyanate, 1,8-naphthalene diisocyanate; 4,4'-oxy(di-p-phenylene) diisocyanate; 4,4'-thiooxy(di-p-phenylene) diisocyanate; 2,2'-dichloro-4,4'-methylene (di-p-phenylene) diisocyanate; bis(4-isocyanatophenyl) sulfoxide. Mixtures of two or more diisocyanates may also be used.

Mixtures of the diisocyanates with organic tri- or higher isocyanates can be used in the practice of this invention where the resulting mixture has an average isocyanate functionality from about 2.00 to 2.15. Examples of suitable tri- or higher isocyanates are the polyaryl polyalkylene polyisocyanates as described in *Encyclopedia of Chemical Technology*, Othmer & Kirk, Vol. 12, pp. 46–47, Interscience Pub. (New York, 1962).

Low molecular weight organic polymers having free isocyanate groups may also be used to form the isocyanate-terminated prepolymers useful in this invention. Useful isocyanate-containing compounds can be prepared by reacting a polymeric material which contains terminal hydroxyl, amino, or carboxyl groups with excess polyisocyanate. The isocyanate-terminated polymers can be prepared before the carbodiimide catalyst is added or the isocyanate-terminated polymer may be generated in the presence of the carbodiimide catalyst.

When a glycol, e.g. a polyalkyleneether glycol, is used to form isocyanate-terminated prepolymers used in this invention, an isocyanate-terminated polyether polyurethane is obtained upon reaction of the glycol with a molar excess of an organic diisocyanate. Representative glycols which may be reacted with an organic diisocyanate include polyalkyleneether glycols, polyalkylenearyleneether glycols, polyalkyleneether-thioether glycols, polyalkylenearyleneetherthioether glycols, polyester glycols, polyhydrocarbon glycols, etc. Polyalkylene-ether glycols such as polyethyleneoxide, polypropyleneoxide, and polytetramethyleneoxide glycols, alkyleneether-thioether glycols, such as thiodiethanol, and hydrocarbon glycols such as 1,4-butanediol, ethylene glycol, propylene glycol, 1,5-pentanediol, octylene glycol, 2-ethyl-2-butyl-1,3-propanediol, 2,2,-di-ethyl -1,3-propanediol, 2-ethyl-1,3-hexanediol, and hexylene glycol are preferred.

The urethane moiety present when a polyol is used to form the prepolymers useful in this invention imparts flexibility and toughness to the cured polycarbodiimide formed from the prepolymers. Polyalkyleneether glycols, such as polypropylene oxide glycol, provide polycarbodiimides with the greatest degree of flexibility, while polyhydrocarbon glycols, such as 1,4-butanediol provide a degree of flexibility intermediate between polyalkyleneether glycols and the aromatic diisocyanates. Use of a thioether glycol, such as thiodiethanol, imparts increased solvent resistance to polycarbodiimides formed from said thioethers.

In forming the low molecular weight prepolymers useful in this invention, the isocyanate equivalent weight of the diisocyanate-terminated monomer or mixture of polyisocyanate monomers as described herein should be about 80–400, with a preferred range of about 87–250. Where the equivalent weight is greater than 400, the polycarbodiimide formed will not be a soluble, frangible prepolymer but rather a rubbery, elastomeric material, which is not latent at room temperature and ultimately reacts completely to form a high molecular weight polymer. When the equivalent weight of the monomer falls below 80, reaction will not occur to form the desired friable, fusible, soluble, prepolymers.

The isocyanates useful for forming a soluble, fusible, frangible prepolymer will have a melting temperature less than 200° C. with a preferred melting point of 40° C. or less. Depending on the particular carbodiimide-forming diisocyanates selected, the reaction mixture can reach a non-tacky, frangible, fusible, soluble solid state when from 2 to about 95 percent of the isocyanate originally present has reacted to carbodiimide. For example, durene diisocyanate becomes solid at about 2 percent reaction and a reaction mixture comprising 80/20 2,4-2,6 tolylene diisocyanate terminated 1,4-butanediol becomes solid at about 16 percent reaction.

The degree of reaction may be extended by heat aging the solid product above room temperature, preferably from about 40° C. to about 80° C. Heating the 80/20 2,4-2,6 6 tolylene diisocyanate terminated 1,4-butanediol mentioned above for 24 hours at 70° C. advanced the reaction from about 16 percent to 53 percent completion.

When the starting reactant is tolylene diisocyanate, the reaction mixture becomes a solid in a short period of time at 25° C. and is approximately 50 percent reacted into a carbodiimide structure when first solidified. The solid will continue to react and will form a non-tacky mass after several hours at 25° C. The solid product of this reaction is an isocyanate-terminated polycarbodiimide prepolymer represented by the structure:

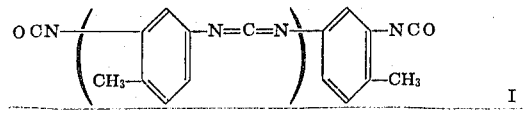

$n=$ about 10 for 80/20 2,4/2,6 tolylene diisocyanate;
$n=$ about 6 for 100 percent 2,4-tolylene diisocyanate, with the 2,4-tolylene diisocyanate reaching a non-tacky state by a rate, an order of magnitude faster than the 80/20 2,4/2,6 mixture.

The material produced by this reaction displays infrared absorption spectra with typical isocyanate and carbodiimide peaks. It melts at 55°–75° C. and is very soluble in methylene chloride and toluene. An isocyanate equivalent weight of approximately 500 (corresponding to about 85 percent reaction) was obtained from the reaction when using a starting mixture of 100 percent 2,4-tolylene diisocyanate and an isocyanate equivalent weight of about 650 (corresponding to 88 percent reaction) from 80/20 2,4-/2,6-tolylene diisocyanate.

The chemical reaction proceeds rapidly but non-exothermically when the catalyst solution is added to the polyisocyanate, e.g. tolylene diisocyanate, at room temperature with the reaction mixture evolving carbon dioxide and turning to a solid When the diisocyanate is a solid at room temperature, the preparation of the polycarbodiimide prepolymer is carried out at a temperature sufficiently high to melt the diisocyanate. Thus, for example, when the polycarbodiimide is prepared from durene diisocyanate, the diisocyanate is heated to the melting point (about 113° C.) and the catalyst added to the liquid diisocyanate. The reaction mixture is then cooled more or less rapidly in accordance with the degree of reaction which is desired. The mixture evolves carbon dioxide and becomes a non-tacky solid.

The solid non-tacky mass of prepolymer is easily pulverized using a mortar and pestle. The powder retains its melting point of approximately 60° C. and its solubility in methylene chloride for up to one month when stored at room temperature. The powdered prepolymers useful in this invention are moderately soluble in aromatic solvents, e.g. benzene and toluene, and readily soluble in chlorinated aromatic and aliphatic solvents, e.g. methylene chloride and chlorobenzene.

After storage, these prepolymers can be cured to the desired form. When heated to 100° C. the powdered prepolymer melts and the polymerization reaction is continued at the curing temperature of from about 75° to 200° C., to produce a high molecular weight polycarbodiimide.

In order to form the prepolymers useful in this invention, the catalyst chosen must have limited activity at room temperature. Additionally, the catalyst must cause further polymerization when the prepolymers are reheated to curing temperatures of up to 200° C., the preferred range of curing temperatures being 75°–150° C.

Suitable catalysts useful for forming the prepolymers useful in this invention includes phospholines, phospholine oxides and sulfides, phospholidines and phospholidine oxides and sulfides. Useful phospholine oxides and sulfides are described in U.S. Pat. Nos. 2,663,737 and 2,663,738. Phospholidene oxides are disclosed in U.S. Pat. No. 2,663,739 and phospholines and phospholidine are described in U.S. Pat. No. 2,663,736. Representative catalysts include 1-phenyl-3-phospholine, 3-methyl-1-phenyl-3-phospholine, 3-(4-methyl-3-pentenyl)-1-phenyl-3-phospholine, 3-methyl-1-phenyl-3-phospholine-1-oxide, 1-ethyl-3-methyl-3-phospholine-1-sulfide, 1-phenyl-phospholidine, 3-methyl-1-phenyl-phospholidine. The presently preferred catalyst is 3-methyl-1-phenyl-2-phospholene-1-oxide.

These prepolymers display reduced toxicity over other known monomeric polycarbodiimide diisocyanate precursors, most of which are inhalation hazards owing to their high volatility and toxicity.

The powdered prepolymers described above are used to make pre-preg materials useful in the present invention. These pre-preg materials may be used alone or in combination with additional powdered prepolymer or other polycarbodiimide precursors to form the structures contemplated in this invention as will be more fully described hereinafter.

A preferred method for making pre-preg compositions useful in the present invention comprises passing a fiber reinforcing material through a fluidized bed of the polycarbodiimide prepolymer powder wherein the prepolymer powder is electrostatically and/or mechanically deposited onto the fibers. Upon leaving the fluidized bed, the powder loaded reinforcing material is passed through a heated zone under conditions such that the powder melts, flows and coats the surface of the reinforcing material. Upon removal from the heated zone, the resulting pre-preg material is partially cooled to a formable non-tacky state and can be shaped, as by pressing, to a wide, flat sheet or fabricated to provide a flexible tape configuration. This material after shaping is further cooled to provide a self-supporting, fused, flowable, pre-preg containing a polycarbodiimide resin having an isocyanate equivalent weight of at least 400 and preferably 400 to about 1100.

As used herein, a "flowable" composition is one that can be made to flow or migrate under conditions of the elevated temperatures (with or without pressure) normally used in processing the pre-preg materials without decomposition and without degradation of the fiber reinforcing materials, e.g. temperatures and pressures up to 200° C. and 500 psi. Thus defined, flowable can include pre-preg materials which have been partially cured under heat and pressure so as to minimize the formation of autogenous voids on complete curing.

During application of heat to the pre-preg materials of this invention, the isocyanate groups in the polycarbodiimide resin react to form carbodiimide linkages and the polymers formed become progressively more crosslinked. This application of heat results in the resins in the pre-preg being converted from a flowable, solvent soluble, isocyanate-containing solid material to a material which is essentially free of reactable isocyanate groups. Compositions containing resins essentially free of reactable isocyanate groups are not pre-pregs within the definition of this invention, and such compositions are not capable of generating carbon dioxide on further heating. Moreover, such compositions cannot be further cured with an isocyanate-containing polycarbodiimide precursor to form a chemically integral structure within the meaning of this invention since substantially no reactive isocyanates remain in the pre-preg to enter into a carbodiimidization reaction.

Application of heat to the pre-pregs of this invention also causes crosslinking of the polycarbodiimide polymers. The crosslinked polymers of this invention can be characterized as being insoluble in solvents which are good solvents for the uncrosslinked polymers, e.g. methylene chloride and toluene. The crosslink density of the crosslinked polymers can be determined by standard methods which relate crosslink density to swelling of the polymer in solvent. An acceptable method of determining crosslink density is set forth in the "Encyclopedia of Polymer Science and Technology", Interscience Publishers, New York (1966), Volume 4, pages 333–334.

The polymers of the present invention may be crosslinked to a greater or lesser extent, depending on the curing conditions employed. The structures of this invention which are required to have a very high strength to weight ratio are desirably crosslinked to a great extent. The pre-pregs of this invention can be crosslinked to a substantially thermoset state by the application of heat, for example, by heating at 150° C. for about 4 hours, whereas a milder heating or curing cycle, for example 150° C. for 10 to 60 minutes, will provide a lightly crosslinked material.

Pre-pregs which are lightly crosslinked, but not yet substantially thermoset, can be formed into useful shapes by the application of pressure and/or heat, and subsequently further crosslinked by the application of heat to form a rigid thermoset structure.

The thickness of the fiber reinforcing materials useful in this invention can vary, depending on the application. Generally the fiber reinforcing material should preferably be at least 5 mils thick and most preferably at least 10 mils in thickness. The maximum thickness will vary depending on the size and strength requirements of the composite structure. Fiber reinforcing materials useful in preparing the pre-preg compositions of the present invention may be of any nature which will be able to physically adapt to the configuration desired and which will retain the ability to perform the desired reinforcing function after completion of the resin cure cycle. Fiber reinforcing materials may be of the inorganic variety, such as, for example, steel, glass, metal, graphite, boron or ceramic, or may be any of the synthetic organic type, such as, for example, the aromatic polyamides, nylons, and polyesters. The fibers may be used in the form of a plurality of unidirectional fibers, e.g. yarns, tows, rovings, whiskers, or in the form of a web, either woven or nonwoven such as a mesh, mat, screen, or cloth with fibers regularly and/or randomly oriented. The fibers may, if desired, be surface treated or primed, such as by treatment with amino silanes, to improve the wetting characteristics of the fiber surface and improve the adhesion of the resin or polymer to the fibers.

The proportions of prepolymer to fiber can be varied greatly to obtain the desired combination of properties, although normally the prepolymer constitutes from 20 to 90 percent, and preferably 30 to 85%, by volume, of the total reinforcing fiber-prepolymer content in the pre-preg. The actual proportion used may be controlled in part by such factors as fiber diameter, type of fiber, porosity of the fiber matrix, prepolymer particle size, density desired, etc. Other filler materials, such as solid lubricant particles, metal or ceramic flakes and powders, fibrids and microfibers, whiskers, mica, graphite, glass beads, microbubbles, coloring pigments, microballoons, etc., may also be included in the pre-preg for performance or decorative purposes.

One preferred aspect of this invention relates to the use of the pre-preg materials described above to provide reinforced, composite, foamed structures having a reinforcing portion or layer which is essentially free of autogenous voids visible to the naked eye. As noted previously, constructions of this type derive maximum strength from the reinforcing portion.

As described above, the prepolymers and pre-preg materials used in this invention can be controlled as to their ability to generate autogenous voids on curing. By combining polycarbodiimide precursors or pre-pregs which foam extensively with those polycarbodiimide prepolymers or pre-pregs which have a reduced tendency to foam, or by confining the pre-preg materials of this invention during cure in such a way that selected portions are free of autogenous voids visible to the naked eye, unique chemically integral structures can be prepared.

A reinforced composite structure useful as a hockey stick can be made according to this invention by die-cutting parts in the desired shape from a pre-preg sheet of this invention. Since these parts will provide the reinforcing properties of the finished structure, it is desirable to choose a pre-preg composition having a reduced tendency to foam, e.g. one containing a prepolymer powder having a minimum amount of free isocyanate groups, although any of the pre-pregs of this invention will perform adequately. The handle portions of the stick are normally prepared in two halves, each half being heated slightly and formed into a channel or U-shape. Both channel members are placed into a shaped aluminum mold along with the blade sections.

Polycarbodiimide prepolymer powder is placed into the channel portion of the handle and between the blade portions. The foamable powder may be any of the prepolymer powders described previously. Their ability to generate a stable foam may be further enhanced by the addition of a surfactant to the powder. Any of the surfactants known to stabilize polymeric foams and which are compatible with the polymer are suitable. Particularly preferred are polymeric aliphatic fluorochemicals such as are described in Example 17 of U.S. Pat. No. 3,574,791.

After the prepolymer powder is added, the mold is closed and placed in a heated oven at about 75° to 200° C. and maintained at cure temperature until the polymer has become crosslinked, generally about 10 minutes to 1 hour. The pre-preg walls of the structure are prevented from forming autogenous voids visible to the naked eye by the confining nature of the mold on the outer surface of the pre-preg walls and by the internal pressure generated by the foaming prepolymer powder in the core of the structure. When the cure is completed, the mold is taken from the oven, cooled, and the cured structure removed. The resulting article has reinforced walls essentially free of autogenous voids visible to the naked eye and a chemically integral foam core. Hockey sticks made by this method may have various weights, dimensions, blade curvature, etc. The flexural modulus of these structures can be made equivalent to that found in aged white ash and is able to withstand high impact at low temperatures.

In addition to hockey sticks, the fiber reinforced composite foam structures of the present invention are useful in the production of other high performance recreational equipment such as tennis rackets, skis, table tennis paddles, as well as for structural members in the construction of modular and mobile housing, as panels, e.g. hyperbolic parabaloid panels used in geodesic domes, in aircraft and automotive structures, and whereever high strength, light-weight rigid structural members are used.

Another preferred aspect of this invention relates to the preparation of flexible reinforcing tapes from the pre-pregs of the present invention. Tape constructions prepared from the pre-pregs of the present invention can be readily stored, as by winding on a core, and subsequently applied to a surface, e.g. by forming, wrapping or adhering, and applying heat to cause foaming of the prepolymer from the pre-preg while curing proceeds to a crosslinked state. The final product is a crosslinked polycarbodiimide foam having a reinforcing portion adjacent the surface to which it is applied. This reinforced, foamed, crosslinked construction has excellent protective, reinforcing and insulating properties in a wide variety of applications.

Also, if desired, the pre-preg or tape construction may be placed in spaced relationship to two surfaces and curing will result in foam formations on both surfaces of the fiber reinforced portion. Alternatively, foam core panels may be prepared by curing two or more pre-preg sheets in a mold with spacers between the pre-preg sheets. On curing, the sheets cure with a skinned top surface where confined by the mold, while foam is generated out of the pre-preg into the interior or core of the construction. The cured construction is useful as a light-weight structural panel.

Other combinations of pre-preg and prepolymer powder can be employed to provide useful constructions. The following examples serve to illustrate, but are not intended to limit the practice of this invention.

Polycarbodiimide prepolymer powders were prepared according to the teachings of Reich U.S. application Ser. No. 242,838 now U.S. Pat. No. 3,755,242.

Powder A

Prepolymer powder was prepared based on a monomer of an 80/20 mixture of 2,4- and 2,6-tolylene diisocyanate. The powder contained 1.0% by weight, based on the initial weight of tolylene-diisocyanate, of 1-phenyl-3-methyl-2-phospholene-1-oxide and 1.0% by weight of a fluorochemical surfactant (a vinyl fluoroaliphatic-acrylate segmented copolymer). The powder had an isocyanate equivalent weight of 650, a melting temperature of 60° – 80° C. and an average particle size of ten microns. When cured at 150° C. for 30 minutes, the powder produced a crosslinked, free-rise foam having a density of about 6 lb./ft.$^3$. Further heating at 150° C. for 3 hours produces a thermoset foam which is stable up to 200° C.

Powder B

Prepolymer powder was prepared which was identical to Powder A but without the fluorochemical surfactant. When cured at 150° C. for 30 minutes, the powder produced a crosslinked free-rise foam having a density of about 12 lb/ft$^3$. The foam was thermoset after an additional 3 hours heating at 150° C.

Powder C

Prepolymer powder was prepared based on a monomer comprised of 3.9 parts of an 80/20 mixture of 2,4-/2,6-tolylene diisocyanate and 1.0 parts dipropylene glycol. The powder contained 1.0% by weight, based on the original monomer, of 1-phenyl-3-methyl-2-phospholene-1-oxide and 0.1% by weight of a fluorochemical surfactant (vinyl fluoroaliphatic-acrylate segmented copolymer). The powder had an isocyanate equivalent weight of 425, a melting temperature of 60° – 80° C., and an average particle size of ten microns. When cured at 150° C. for 60 minutes, the powder produced a crosslinked free-rise foam having a density of about 2 lb/ft$^3$. Additional heat at 150° C. for 3 hours produced a thermoset foam.

Powder D

Prepolymer powder was prepared which was similar to Powder B and which contained 20% by weight, based on the original monomer, of inorganic titanate whiskers (Dupont FYBEX, diameter 0.1$\mu$ and length to diameter ratio of 40 to 1). When cured at 150° C., for 30 minutes, the powder produced a crosslinked, free-rise foam having a density of about 30 lb/ft$^3$. The foam was thermoset on heating for an additional 3 hours at 150° C.

EXAMPLE 1

Glass Cloth (Burlington, Style 143, 8.78 oz/yd.$_2$, 4-shaft satin) having a thickness of 9 mils was heated over an open flame and passed through a fluidized bed of polycarbodiimide prepolymer powder A. The powder melted and flowed onto the hot cloth and on cooling, a cohesive flexible pre-preg was obtained which contained 60% by volume resin. A reinforced composite foam was made by placing 9 plies of the pre-preg in a 3 × 8 inch mold 2 inches deep, depositing 300 g. of prepolymer powder A in the mold and laying an additional 9 plies of the pre-preg over the powder to form a sandwich. The mold was closed and the contents cured for one hour at 150° C. The resulting reinforced composite foam panel had an overall density of 30 lb/ft$^3$ with a core density of 16 lb/ft$^3$. The panel was extremely strong and resisted continued battering even after cooling to liquid nitrogen temperatures.

EXAMPLE 2

Glass Cloth was coated as in Example 1. The powder comprised 40% by volume of the pre-preg composition. The pre-preg was placed in a 3 × 8 inch mold, 2 inches deep, with an additional 300 g. of powder A deposited between the two layers of the pre-preg. Curing for 1 hour at 150°C. produced a reinforced composite foam. A panel having smooth surfaced reinforced outer skins and a low density foamed core was obtained.

EXAMPLE 3

Glass Cloth was coated as in Example 1. The powder comprised 81% by volume of the pre-preg construction. Two plies of this pre-preg were separated with spacers and cured in a closed mold, without additional prepolymer powder, for 1 hour at 150°C. The resulting reinforced composite foam structure comprised a 1/4 inch foam core and glass cloth reinforced skins. Structures of this type were found to be suitable as blades for lightweight, high strength, table tennis paddles.

In the following examples, the ceramic fiber referred to is a transparent, refractory aluminum borosilicate (3 $Al_2O_3:B_2O_3.2\ SiO_2$) fiber prepared in accordance with copending application S.N. 119726, filed March 1, 1971. The aromatic polyamide fiber is Dupont PRD 49.

EXAMPLE 4

Unidirectional ceramic fiber was coated with powder A. The powder was dispensed from a hopper onto hot fiber at 150° C. The coated fiber was cooled and wound onto a drum. The drum-wound, fused powder/fiber composition contained 60% by volume resin and provided a pre-preg material suitable for lay-up and cure.

EXAMPLE 5

Ceramic fiber was coated with powder A in a fluidized bed. The coated fiber was drum wound as in Example 4 and provided a pre-preg suitable for lay-up and cure.

EXAMPLE 6

Unidirectional unsized ceramic fiber was passed through a fluidized bed of polycarbodiimide prepolymer powder A at a speed of 20 feet/minute for a distance of 8 inches. The resin was deposited on the fiber. The powder-fiber composition was then warmed to fuse the powder and coat the fiber. The coated fiber was then drum wound to provide a fused powder pre-preg composition. The resulting pre-preg composition comprised 67% by volume of fused powder. A reinforced composite from 4 plies of the pre-preg was prepared by placing the plies in a mold and curing for one hour at 150° C. and a pressure of 4,000 psi. The cured composite was a reinforced structure free of autogenous voids visible to the naked eye, having a flexural modulus of $1.66 \times 10^6$ psi at room temperature.

EXAMPLE 7

Example 6 was repeated using an epoxy resin size (Shell Chemical, EPON 828) on the fiber. The fiber was passed through 4 inches of the fluidized bed at 60 feet/minute. The powder comprised 40% by volume of the pre-preg composition. The cured structure was free of autogenous voids visible to the naked eye and had a flexural modulus of $5.6 \times 10^6$ psi at room temperature.

EXAMPLE 8

Unidirectional glass fibers (Owens Corning) continuous strand rovings were passed through a fluidized bed at a depth of 2 inches (total distance in bed = 4 inches). Prepolymer powder A was entrained on the fiber and the fiber was then passed through a 2 foot heat zone at 135° C. at a speed of 3 feet/minute. Immediately on emerging from the heat zone all of the tacky powder coated fibers were brought together to form a single rope. Upon further cooling to about 60° C. the rope reached a non-tacky, but formable state, and was pressed to a 0.06 inch thick × 1½ inch wide flat board-stock or sheet configuration and cooled to provide a rigid, fused powder, pre-preg composition.

The pre-pregs obtained could be laminated to each other or to uncoated glass cloth by a simple application of heat and pressure. The pre-preg constructions could also be joined to each other in an endwise or edgewise fashion, thus offering the ability to prepare large sections from smaller panels. Typical conditions for laminating or edge sealing are 10 – 60 seconds at 90 – 150° C. and 1 – 100 psi.

Pre-preg constructions were laminated together to produce sheet stock. Members in the shape of a hockey stick, lie 5, average size, were die-cut from this stock. The handle portions in two halves were heated slightly and formed into two channel shapes. These sections, along with the blade sections, were placed in an aluminum mold in the shape of a hockey stick. Polycarbodiimide prepolymer powder A of a sufficient mass (100 grams) to yield a 10 pcf foam core was placed into the channel portion of the handle and the blade, the mold closed and placed in a heated oven at 150° C. for about one-half hour, removed from the oven and cooled. The cured hockey stick was lighter than the equivalent sized white ash and rock elm wood analog. The flexural modulus of the stick was equivalent to that found in aged white ash, i.e. $1.6 \times 10^6$ psi. The stick was able to withstand high impact at cold temperatures.

EXAMPLE 9

Example 8 was repeated using powder B in the pre-preg and powder A in the core. The pre-preg using powder B tended to generate fewer voids on curing and provided a composite having relatively more dense skins than that obtained in Example 8.

EXAMPLE 10

Example 8 was repeated, except that prepolymer powder C was used to provide the foam core. The cured, reinforced composite foam had fewer voids in the reinforcing portion than in Example 8 due to the greater amount of carbon dioxide generated by powder C.

EXAMPLE 11

Example 8 was repeated except that prepolymer powder D was used in place of powder A in the pre-preg. The cured, reinforced composite foam had fewer autogenous voids visible to the naked eye in the reinforcing portion than in Example 8.

EXAMPLE 12

A pre-preg was made by coating aromatic polyamide fiber (Dupont) with prepolymer powder A as in Example 5. A pre-preg composition comprising 30% by volume fused powder was obtained.

EXAMPLE 13

Pre-preg compositions were made by laminating multiple plies of pre-preg and glass fiber as shown below.
I. 1st layer - glass cloth, 10 mil
 2nd layer - unidirectional glass fiber pre-preg, 50 mil fiber
 3rd layer - glass cloth, 10 mil.
II. 1st layer - glass cloth, 10 mil.
 2nd layer - unidirectional glass fiber pre-preg, 45 mil fiber
 3rd layer - aromatic polyamide fiber pre-preg, 10 mil fiber
III. 1st layer - glass cloth, 10 mil
 2nd layer - unidirectional glass fiber pre-preg, 40 mil fiber
 3rd layer - aromatic polyamide fiber pre-preg, 10 mil fiber
 4th layer - ceramic fiber pre-preg, 10 mil fiber
IV. 1st layer - glass fiber (30° cross-ply) pre-preg 20 mil fiber
 2nd layer - unidirectional glass fiber pre-preg, 20 mil fiber
 3rd layer - glass fiber (30° cross-ply) pre-preg, 20 mil fiber.

Reinforced composite foam panels were prepared using the above pre-pregs in combination with additional prepolymer powder A as the foam core material. The cured panels were light weight and had a high strength-to-weight ratio.

EXAMPLE 14

A tape was prepared from the pre-preg prepared in Example 8 by cutting a 4 foot × 1-½ inch strip from the pre-preg. The pre-preg was wound onto a core suitable for storage and subsequent convenient application application as a tape. The tape could be readily unwrapped on slight warming due to its flexible and non-tacky nature.

The tape was warmed to 50° C. and wrapped onto a warm glass pipe (50°C.). The edges of the tape wrap were abutted and the entire wrap was cured at 150° C. for one hour. On curing, the tape foamed and the abutted edges were fused, leaving the fiber reinforcing material in contact with the glass. The glass pipe was then shattered and the glass remained intact with no breakage of the composite foam-fiber outerwrap. Variations in the choice of prepolymer powder used to prepare the pre-preg, resin-to-fiber ratio in the pre-preg, and choice of reinforcing fiber can provide tapes with varied foaming and reinforcing properties.

What is claimed is:

1. A self supporting fiber reinforced pre-preg comprising a cohesive admixture of fiber reinforcing material and fused thereon a solid, flowable, isocyanate-containing polycarbodiimide prepolymer, said prepolymer having a curing catalyst dispersed therein, said catalyst capable of catalyzing the reaction between isocyanate groups to form carbodiimide linkages under the influence of heat.

2. A fiber reinforced pre-preg according to claim 1 wherein said prepolymer has an isocyanate equivalent weight of at least 400.

3. The fiber reinforced pre-preg of claim 1 wherein said fiber reinforcing material is a fiber web.

4. The fiber reinforced pre-preg of claim 1 wherein said prepolymer constitutes from 20 – 90 percent by volume of the total volume of prepolymer and reinforcing fiber.

5. The fiber reinforced pre-preg of claim 1 wherein said polycarbodiimide propolymer is capable of generating autogenous voids visible to the naked eye when cured by the application of heat.

6. The fiber reinforced pre-preg of claim 1 wherein said polycarbodiimide prepolymer is capable of cure upon the application of heat without generation of autogenous voids visible to the naked eye.

7. A pre-preg according to claim 1 wherein said prepolymer contains an additional particulate filler dispersed therein.

8. A pre-preg according to claim 7 wherein said filler comprises mica flakes.

9. A pre-preg according to claim 7 wherein said filler comprises inorganic titanate whiskers.

10. A chemically integral, fiber reinforced, composite foam structure comprising crosslinked polycarbodiimide polymer and a fiber reinforcing material, said structure comprising
   a. at least one first reinforcing portion, said reinforcing portion comprising fiber reinforcing material and said polycarbodiimide polymer, said reinforcing portion being essentially free of autogenous voids visible to the naked eye, and
   b. at least one second foamed portion comprising said polycarbodiimide polymer, said first portion being chemically integral with said second portion.

11. A chemically integral, fiber reinforced composite foam structure according to claim 10 wherein said reinforcing portion has a minimum thickness of 5 mils.

12. A method of making a chemically integral, fiber reinforced, composite foam structure comprising
   a. providing a pre-preg material comprising solid polycarbodiimide prepolymer fused onto reinforcing fibers, said prepolymer having a curing catalyst homogeneously dispersed therein, said prepolymer capable of curing to form a polycarbodiimide polymer with the application of heat,
   b. contacting said pre-preg material with foamable polycarbodiimide precursors and maintaining said precursors adjacent said pre-preg material, and
   c. heating said pre-preg material and said foamable polycarbodiimide precursors substantially simultaneously under conditions sufficient to cause foaming of said foamable polycarbodiimide precursors and to cause crosslinking of said fused prepolymer in said pre-preg, said crosslinking occurring essentially without the formation of autogenous voids visible to the naked eye.

13. A method according to claim 12 wherein said pre-preg material is formed so as to substantially enclose said precursors.

14. A flexible, reinforced tape comprising a cohesive admixture of fiber reinforcing material and fused thereon a solid, flowable, isocyanate-containing polycarbodiimide prepolymer, said prepolymer having a curing catalyst dispersed therein, said catalyst capable of catalyzing the reaction between isocyanate groups to form carbodiimide linkages under the influence of heat.

15. A tape according to claim 14 wherein said prepolymer has an isocyanate equivalent weight of at least 400.

16. A tape according to claim 14 wherein said prepolymer constitutes from 20 – 90 percent by volume of the total volume of prepolymer and reinforcing fiber.

17. A method of making a chemically integral, fiber reinforced, foamed structure comprising
   a. providing a flexible, reinforced tape comprising a cohesive admixture of fiber reinforcing material and fused thereon a solid, flowable, isocyanate-containing polycarbodiimide prepolymer, said prepolymer having a curing catalyst dispersed therein, said catalyst capable of catalyzing the reaction between isocyanate groups to form carbodiimide linkages under the influence of heat,
   b. applying said tape to a substrate, and
   c. heating said tape to cause foaming by the generation of carbon dioxide from the carbodiimide forming reaction of said prepolymer, and
   d. continuing said heating to form a crosslinked polycarbodiimide polymer.

* * * * *

UNITED STATES PATENT OFFICE
CERTIFICATE OF CORRECTION

PATENT NO. : 3,859,162
DATED : January 7, 1975
INVENTOR(S) : James William Johnson, John E. Peterson, and Charles Reich It is certified that error appears in the above-identified patent and that said Letters Patent are hereby corrected as shown below:

Column 8, line 26, delete the "6" just before "tolylene" so it reads -- 2,4-2,6 tolylene -- .

Column 9, line 7, there should have been a space between "is" and "desired".

Column 13, line 17 (near the end of the line), "1.0%" should have been -- 0.1% -- ; and
line 65 (the first line in Example 1, near the end of the line) "yd.$_2$" should be -- yd.$^2$ -- so it reads -- 8.78 oz/yd.$^2$, -- .

Column 14, line 37, after the second occurrence of "O$_3$" change the dot " . " to a colon -- : -- so the equation within the parentheses reads:

(3 Al$_2$O$_3$:B$_2$O$_3$:2 SiO$_2$).

Signed and sealed this 24th day of June 1975.

(SEAL)
Attest:

RUTH C. MASON
Attesting Officer

C. MARSHALL DANN
Commissioner of Patents
and Trademarks